United States Patent
Giles et al.

(10) Patent No.: US 9,559,800 B1
(45) Date of Patent: Jan. 31, 2017

(54) DYNAMIC PACKET FILTERING

(75) Inventors: Rick Giles, San Jose, CA (US); Phuong Nguyen, Newark, CA (US)

(73) Assignee: VMware, Inc., Palo Alto, CA (US)

( * ) Notice: Subject to any disclaimer, the term of this patent is extended or adjusted under 35 U.S.C. 154(b) by 822 days.

(21) Appl. No.: 12/605,278

(22) Filed: Oct. 23, 2009

Related U.S. Application Data

(60) Provisional application No. 61/108,478, filed on Oct. 24, 2008.

(51) Int. Cl.
*H04L 29/06* (2006.01)
*H04J 13/18* (2011.01)
*H04J 13/22* (2011.01)

(52) U.S. Cl.
CPC .............. *H04J 13/18* (2013.01); *H04J 13/22* (2013.01)

(58) Field of Classification Search
CPC ................... H04L 29/06578; H04L 29/06585; H04L 29/06591; H04L 29/06986
USPC ...... 370/389, 235, 392, 229–231.1; 709/235, 709/220–223; 707/758
See application file for complete search history.

(56) References Cited

U.S. PATENT DOCUMENTS

| | | | |
|---|---|---|---|
| 6,219,706 B1 | 4/2001 | Fan et al. | |
| 6,430,183 B1 * | 8/2002 | Satran et al. | 370/389 |
| 6,871,284 B2 | 3/2005 | Cooper et al. | |
| 6,983,379 B1 | 1/2006 | Spalink et al. | |
| 7,020,082 B2 | 3/2006 | Bhagavath et al. | |
| 7,215,637 B1 * | 5/2007 | Ferguson et al. | 370/230.1 |
| 7,433,943 B1 | 10/2008 | Ford | |
| 7,941,827 B2 | 5/2011 | John et al. | |
| 7,986,629 B1 * | 7/2011 | Ferguson et al. | 370/235 |
| 8,024,779 B2 | 9/2011 | John et al. | |
| 8,166,554 B2 | 4/2012 | John | |
| 8,214,875 B2 | 7/2012 | John et al. | |
| 2001/0039579 A1 | 11/2001 | Trcka et al. | |
| 2003/0172292 A1 | 9/2003 | Judge | |
| 2004/0107360 A1 * | 6/2004 | Herrmann et al. | 713/201 |
| 2005/0050338 A1 | 3/2005 | Liang et al. | |
| 2005/0193429 A1 | 9/2005 | Demopoulos et al. | |
| 2005/0251510 A1 | 11/2005 | Billingsley et al. | |
| 2006/0236370 A1 | 10/2006 | John et al. | |
| 2007/0061433 A1 * | 3/2007 | Reynolds et al. | 709/223 |
| 2007/0094265 A1 | 4/2007 | Korkus | |
| 2007/0157286 A1 | 7/2007 | Singh et al. | |
| 2007/0174905 A1 | 7/2007 | Martherus et al. | |
| 2008/0148381 A1 * | 6/2008 | Aaron | H04L 63/1408 726/11 |
| 2008/0291923 A1 * | 11/2008 | Back | H04L 45/04 370/396 |

(Continued)

OTHER PUBLICATIONS

U.S. Appl. No. 12/605,262, specification, claims and drawings as filed Oct. 23, 2009.

(Continued)

*Primary Examiner* — Edan Orgad
*Assistant Examiner* — Emmanuel Maglo

(57) ABSTRACT

A solution for dynamic packet filtering includes, at a network device, if an n-tuple of a packet matches an n-tuple filter, applying an action of the filter to the packet. If the packet has not been discarded as a result of the filter application, and if the packet is identified, by using payload portion, as a network application associated with a filter policy, an n-tuple filter is generated based on the packet. If the application ID of the packet is not associated with a filter policy, the packet is forwarded to the network application.

22 Claims, 4 Drawing Sheets

(56) References Cited

U.S. PATENT DOCUMENTS

| | | | | |
|---|---|---|---|---|
| 2009/0031414 A1* | 1/2009 | Winter | ................. | H04L 63/102<br>726/15 |
| 2010/0023726 A1* | 1/2010 | Aviles | ................. | G06F 12/0813<br>711/216 |
| 2010/0095064 A1* | 4/2010 | Aviles | ................. | H04L 67/2852<br>711/118 |
| 2011/0264822 A1* | 10/2011 | Ferguson et al. | ............. | 709/235 |

OTHER PUBLICATIONS

U.S. Appl. No. 12/605,268, specification, claims and drawings as filed Oct. 23, 2009.
U.S. Appl. No. 12/605,287, specification, claims and drawings as filed Oct. 23, 2009.
Final Rejection for U.S. Appl. No. 121605,268, mailed Aug. 14, 2012.

* cited by examiner

DYNAMIC PACKET FILTERING

CROSS REFERENCE TO RELATED APPLICATIONS

This application claims the benefit of provisional patent application No. 61/108,478 filed Oct. 24, 2008, entitled "Systems and Methods for Network Traffic Processing," the disclosure of which is incorporated herein in its entirety by reference. This application is related to the following commonly assigned applications: patent application Ser. No. 12/605,262 filed Oct. 23, 2009, entitled "Association of Network Traffic to Enterprise Users in a Terminal Services Environment"; patent application Ser. No. 12/605,268 filed Oct. 23, 2009, entitled "Network Rule Builder"; and patent application Ser. No. 12/605,287 filed Oct. 23, 2009, entitled "Rapid Evaluation of Numerically Large Complex Rules Governing Network and Application Transactions".

FIELD OF THE INVENTION

The present invention relates to the field of computer science. More particularly, the present invention relates to dynamic packet filtering.

BACKGROUND OF THE INVENTION

A network monitoring system monitors traffic on a network and must process all of the packets in order to avoid lost information. One symptom of reaching a processing limit is lost packets due to overflow of buffer capacity.

A network monitoring system typically has two major processing blocks. One processing block receives the packet, and a second block processes the packet. The "receiving" of the packet and "processing" of the packet typically reside on the same computational platform and both blocks compete for CPU and memory resources. For example, if the receiving block utilizes 80% of the computational capacity of the system, only 20% of the computational capacity of the system remains to perform the "processing" phase. The value added work in a network monitoring system is in the "processing" phase. Any reduction of load from the "receiving" phase will add capacity to the "processing" phase and translate into improved performance of the system and thus allowing more advanced application "processing" that addresses real customer needs.

One solution that addresses the problem of excessive packet load filters incoming packet traffic by dropping packet traffic that is not of interest to the system that is under customer control. In firewall-type systems, this filtering is typically done by configuring firewall rules to selectively allow or deny traffic. Any traffic that is denied would not be forwarded. These firewall rules inspect the header of the TCP/IP packets, and operate on what is referred to as the 5-tuple of source address, source port, destination address, destination port and protocol. These rules are typically created to deny or allow traffic on a particular application protocol such as FTP or HTTP. These rules work well when the ports are well known since static rules can be created to allow or deny traffic. But in the case where the customer wants to specify a rule such as "Block all FTP" traffic, the standard firewall rule will not suffice. Accordingly, a need exists in the art for an improved solution for packet filtering.

SUMMARY OF THE INVENTION

A solution for dynamic packet filtering includes, at a network device, if an n-tuple of a packet matches an n-tuple filter, applying an action of the filter to the packet. If the packet has not been discarded as a result of the filter application, and if the packet is identified, by using payload portion, as a network application associated with a filter policy, an n-tuple filter is generated based on the packet. If the application ID of the packet is not associated with a filter policy, the packet is forwarded to the network application.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Figure 1:
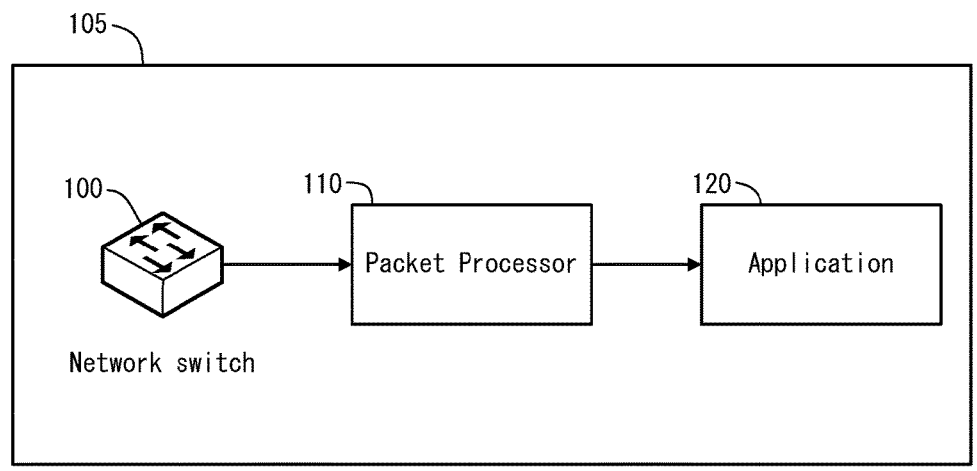
FIG. 1 is a high level block diagram that illustrates a system for dynamic packet filtering in accordance with one embodiment of the present invention.

Embodiments of the present invention are described herein in the context of dynamic packet filtering. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an such as Solaris® available from Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the dynamic packet filtering system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide a dynamically generated rule based upon application identification of the traffic. This application identification is the result of inspection of the payload portion of the packet regardless of port. In the instance of HTTP, it does not matter if it runs on the well known port 80 or any other port. The rule will still apply because the traffic will be detected as HTTP traffic and a specific rule will be activated on that newly discovered port.

FIG. 1 is a high level block diagram that illustrates a system for dynamic packet filtering in accordance with one embodiment of the present invention. As shown in FIG. 1, the network monitoring system 105 includes a network switch 100 configured to forward packets to the packet processor 110. The packet processor 110 is configured to perform the filtering function that is described in more detail below. The packet processor 110 is also configured to forward packet-related data to the monitoring application 120.

Figure 2:
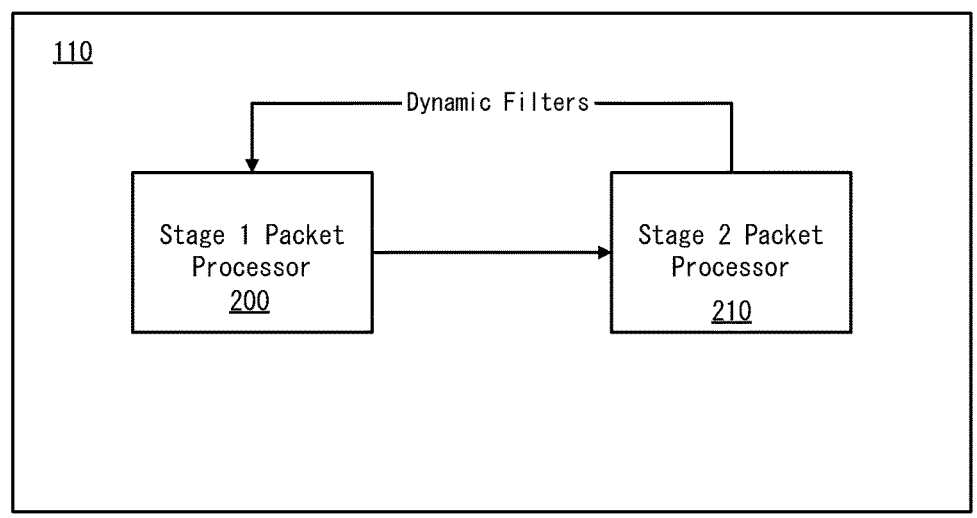
FIG. 2 is the block diagram that illustrates a packet processor in accordance with one embodiment of the present invention.

FIG. 2 is the block diagram that illustrates a packet processor in accordance with one embodiment of the present invention. FIG. 2 shows a more detailed view of the packet processor block 110, and divides the functionality into two stages. Stage one (200) is configured to receive raw packets from the network switch 100, and apply a filter function to each packet. Stage two (210) is configured to dynamically identify the traffic as to which network application it is related, detect any policy against such applications, and then download the related filters to stage one (200). These two stages can exist within the same process, or be separated by process boundaries. They can also be separated by a bus such as PCI, or network.

Example network applications include File Transfer Protocol (FTP), Network File System (NFS), Common Internet File System (CIFS), Secure Shell (SSH), Secure Sockets Layer (SSL), Hypertext Transfer Protocol (HTTP), Microsoft SQL (MSSQL), SharePoint, and Outlook Web Access. Other applications are possible. Some applications such as Outlook Web Access and SharePoint use HTTP as an underlying transport, and it is the job of the application identification block (505) to identify the traffic so that any relevant filter can be activated.

Figure 3:
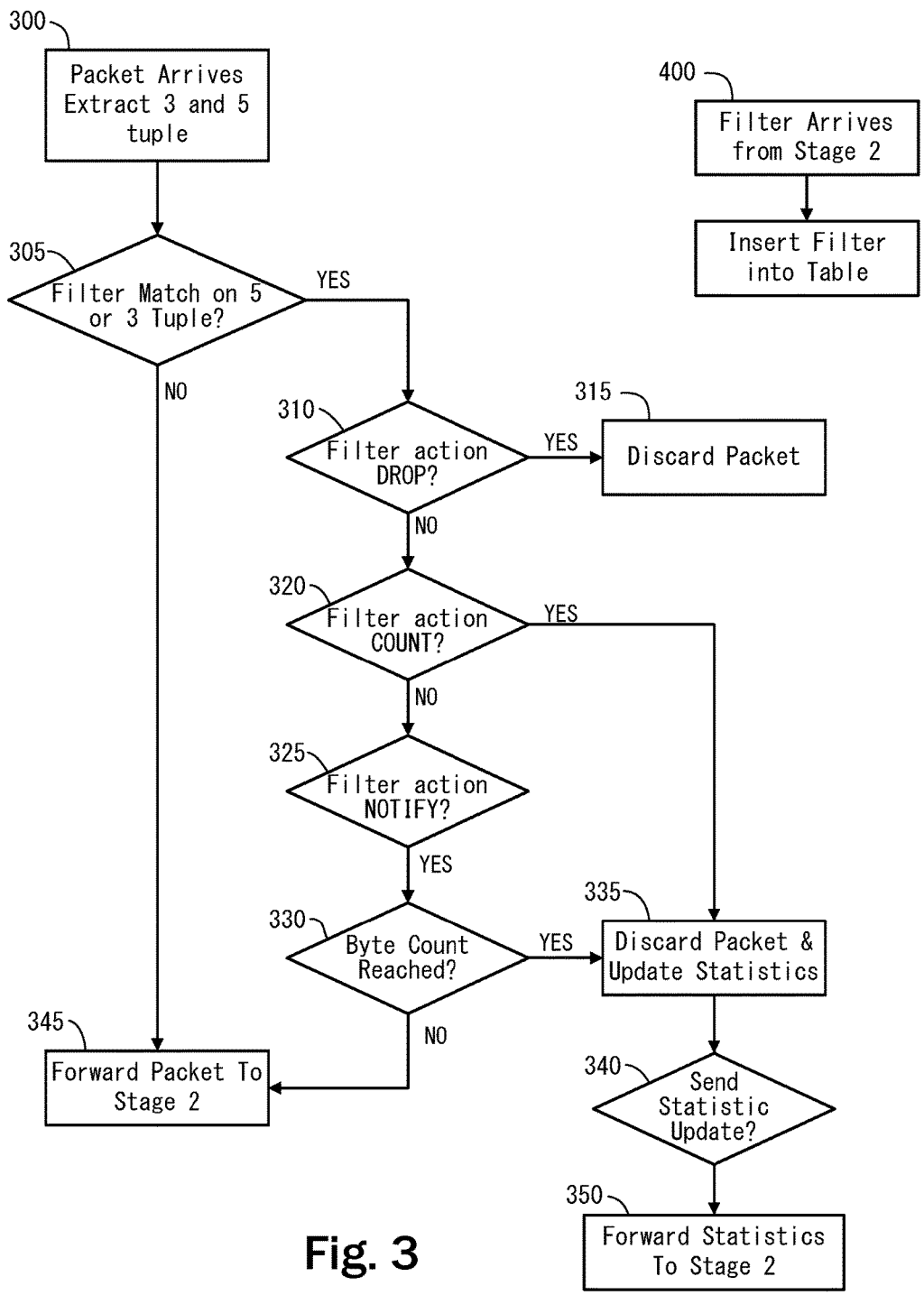
FIG. 3 is a flow diagram that illustrates a method for stage one of a packet processor block in accordance with one embodiment of the present invention.

FIG. 3 is a flow diagram that illustrates a method for stage one 200 of a packet processor in accordance with one embodiment of the present invention. The processes illustrated in FIG. 3 may be implemented in hardware, software, firmware, or a combination thereof. Filters are downloaded from stage two (210) as seen in block 400. These filters are inserted into a local table that will be accessed by the receiving process shown at block 305.

Once a packet arrives from the network device such as a switch (100), a tap, or other networking device, the 3- and 5-tuple from the packet is extracted at block 300. These tuples act as a type of key used to look for matching filter records (605, 610) that are stored in a local table. If there are any matches on either 3- or 5-tuple then a filter action will be performed. If no filter record is found then the packet will be unconditionally forwarded to stage two. The filter actions that can be performed include the following:

DROP (310)—The packet is discarded, no further action is required.

COUNT (320)—The byte count, and packet count statistics are recorded, and the packet is discarded. These statistics will periodically be forwarded to stage two based upon a periodic timer or packet count reached (340, 350).

NOTIFY (325)—The packet will be forwarded until a specified byte count is reached. For instance, if the NOTIFY filter byte count is set to 2000, and the first packet is 1000 bytes, and the second packet is 1200 bytes, these two packets will be forwarded to stage two, and any subsequent packets that match the same filter will be counted and dropped (330 to 335 transition).

Figure 4:
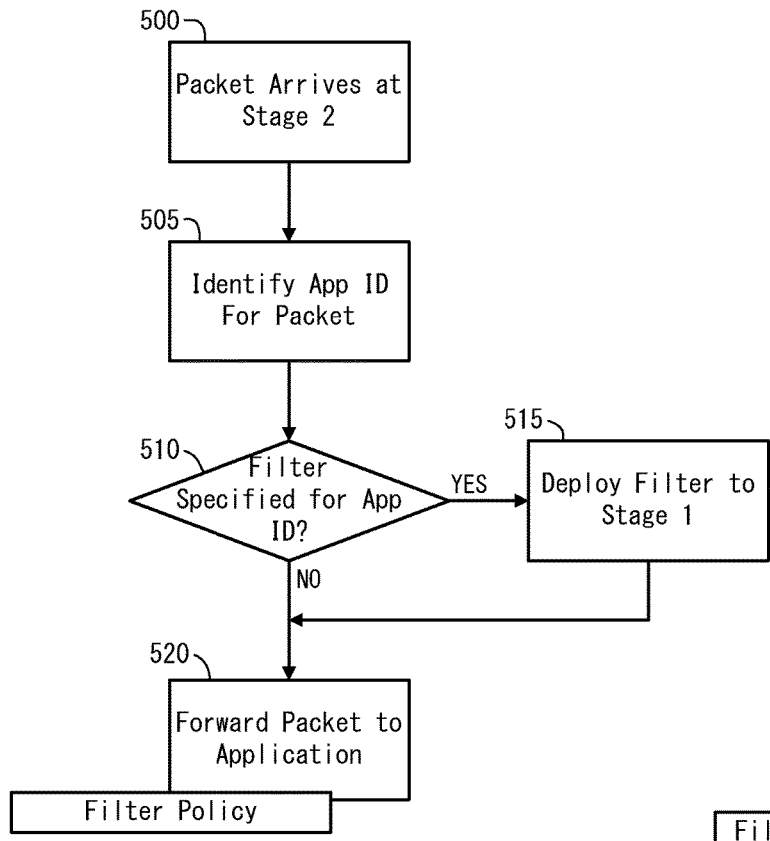
FIG. 4 is a flow diagram that illustrates a method for stage two of a packet processor block in accordance with one embodiment of the present invention.

FIG. 4 is a flow diagram that illustrates a method for stage two (210) of a packet processor block in accordance with one embodiment of the present invention. The processes illustrated in FIG. 4 may be implemented in hardware, software, firmware, or a combination thereof. Upon arrival of a packet at stage two (500) an application identification process is applied. The process at block 505 will uniquely identify the application. This application ID is used to look up relevant filter policy (510) that would be stored in a policy table with application ID as the key. If a relevant policy isn't identified, then the packet is forwarded to the application (510-520 transition). If a policy does exist for the specified application, then a 3-tuple and a 5-tuple filter (see reference numerals 605 and 610 of FIG. 5) is generated and forwarded to stage one of the packet processor (515).

Figure 5:
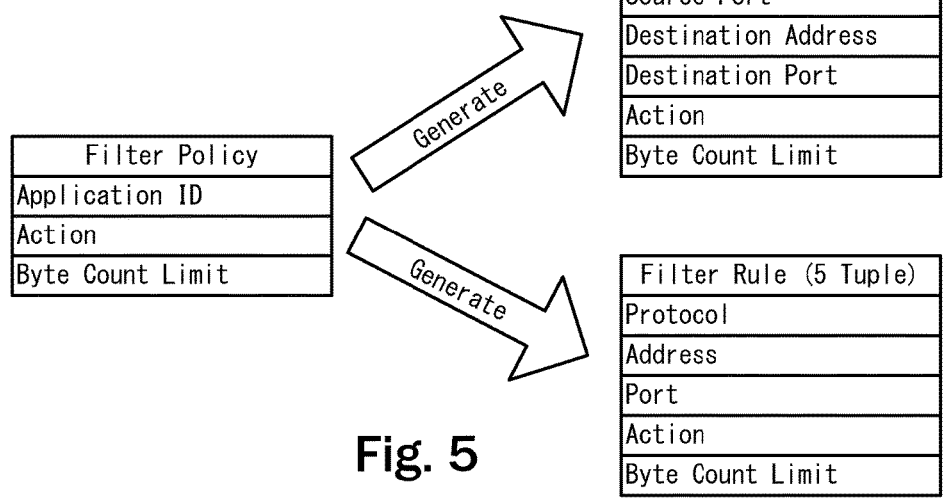
FIG. 5 is a block diagram that illustrates a transformation of a filter policy record into one or more filter rules that would be downloaded to stage 1 of the processor block in accordance with one embodiment of the present invention.

FIG. 5 is a block diagram that illustrates a transformation of a filter policy record into one or more filter rules that would be downloaded to stage one of the processor block in accordance with one embodiment of the present invention. FIG. 5 shows filter policy 600, and both 3-tuple (605) and 5-tuple (610) filter rules that are generated based upon a policy match. A match is defined as any policy that matches the application ID field with the application ID of the packet. Both filter rules 605 and 610 are derived from the received packet header, and the policy record (600). The action and byte count limit fields are copied directly from the filter policy to both 605 and 610 records. The protocol field is copied from the protocol field of the IP header for both filter rule types. For filter rule 605, the source address, source port, destination address, destination port fields are copied directly from fields of the same name in the TCP/IP packet header. For filter rule 610, the address field is copied from the destination address of the IP header, and the port is copied from the destination port of the TCP header.

The stage one filter logic of FIG. 3 performs a search in the following manner and order (300, 305). The first match performs that action defined in the rule and no subsequent matches are performed.

5-tuple (extract 5-tuple from incoming packet as the key in filter rule table)

5-tuple (swap source and dest ports, swap source and dest addresses from incoming packet, use as key into filter rule table)

3-tuple (extract protocol, dest address, dest port, as a key in filter rule table)

3-tuple (extract protocol, source address, dest port, as key in filter rule table)

Figure 6:
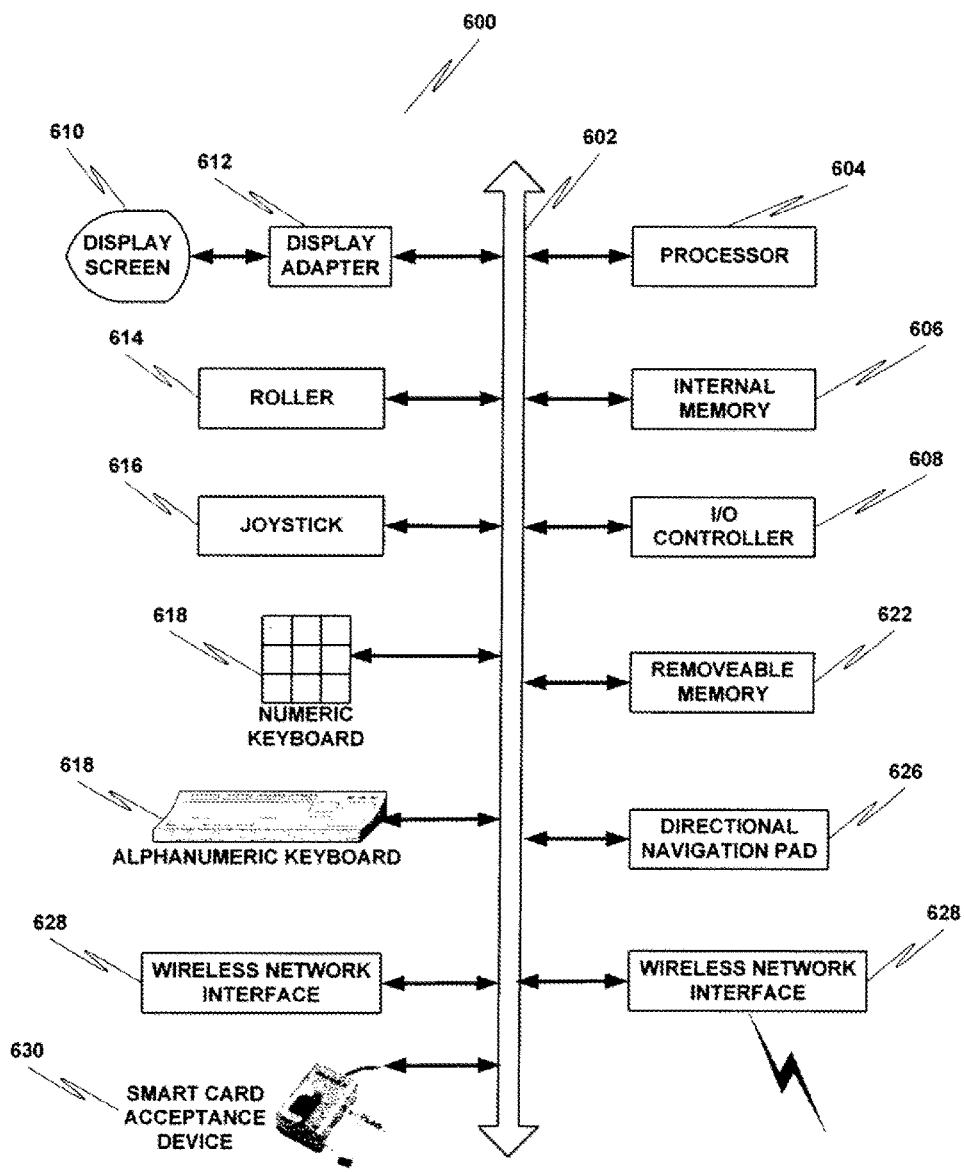
FIG. 6 is a block diagram of a computer system suitable for implementing aspects of the present invention.

FIG. 6 depicts a block diagram of a computer system 600 suitable for implementing aspects of the present invention. As shown in FIG. 6, system 600 includes a bus 602 which interconnects major subsystems such as a processor 604, an internal memory 606 (such as a RAM), an input/output (I/O) controller 608, a removable memory (such as a memory card) 622, an external device such as a display screen 610 via display adapter 612, a roller-type input device 614, a joystick 616, a numeric keyboard 618, an alphanumeric keyboard 618, directional navigation pad 626, smart card acceptance device 630, and a wireless interface 620. Many other devices can be connected. Wireless network interface 620, wired network interface 628, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 7 to be present to practice the present invention. Furthermore, the devices and subsystems may be interconnected in different ways from that shown in FIG. 6. Code to implement the present invention may be operably disposed in internal memory 606 or stored on storage media such as removable memory 622, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A computer implemented method comprising:
 determining that an n-tuple of a packet does not match an n-tuple filter, wherein "n" is 3 or 5; and at a network device, upon determining that the n-tuple of the packet does not match the n-tuple filter:
   determining an identification of an application from a payload portion of the packet, the application identification ("ID") identifying a network application of the packet;
   upon determining the application ID is associated with a filter policy, generating an n-tuple filter based on the packet;
   storing the generated n-tuple filter;
   receiving a second packet; and
   upon determining that an n-tuple of the second packet does match the generated n-tuple filter, applying a filter action based on the generated filter and the received second packet, wherein the filter action is selected from: discarding the second packet; recording a byte count and a packet count for the second packet; and forwarding the second packet until a specified byte count is reached.

2. The method of claim 1 wherein the network application comprises one of File Transfer Protocol (FTP), Network File System (NFS), Common Internet File System (CIFS), Secure Shell (SSH), Secure Sockets Layer (SSL), Hypertext Transfer Protocol (HTTP), Microsoft SQL (MSSQL), SharePoint, and Outlook Web Access.

3. The method of claim 1 wherein the filter policy comprises:
   an application ID identifying a network application;
   an action indicating an action to be performed on a packet; and
   a byte count limit.

4. The method of claim 1 wherein identification of an application is based on an inspection of the payload portion of the packet regardless of a port.

5. A method of claim 3, wherein the n-tuple filter is based on a header of the packet and the filter policy.

6. The method of claim 5, wherein the 3-tuple filter comprises three of the following:
   a protocol field;
   an address field;
   a port field;
   an action field; and
   a byte count limit field.

7. The method of claim 5, wherein the 5-tuple filter comprises five of the following:
   a protocol field;
   a source address field;
   a source port field;
   a destination address field;
   a destination port field;
   an action field; and
   a byte count limit field.

8. A method of claim 5, wherein generating the n-tuple filter based on the packet comprises one or more of the following:
   applying the action from the filter policy to the n-tuple filter; and
   applying the byte count limit from the filter policy to the n-tuple filter.

9. The method of claim 6 wherein
   the address field is copied from a destination address field of an IP header of the packet; and
   the port field is copied from a destination port field of a TCP header of the packet.

10. The method of claim 7 wherein
    the source address field is copied from a source address field of a TCP header of the packet;
    the source port field is copied from a source port field of the TCP header;
    the destination address field is copied from a destination address field of the TCP header; and
    the destination port field is copied from a destination port field of the TCP header.

11. A method of claim 8, wherein generating the n-tuple filter based on the packet further comprises applying one or more of the following from the header of the packet to the n-tuple filter:
    a protocol field;
    a source address; source port;
    a destination address; and
    a destination port field.

12. A network device comprising:
    a memory; and
    one or more processors configured to:
       determine that an n-tuple of a packet does not match an n-tuple filter, wherein "n" is 3 or 5; and
       upon determining that the n-tuple of the packet does not match the n-tuple filter:
          determine an identification of an application from a payload portion of the packet, the application identification ("ID") identifying a network application of the packet;
          upon determining the application ID is associated with a filter policy, generate an n-tuple filter based on the packet;
          store the generated n-tuple filter;
          receive a second packet; and
          upon determining that an n-tuple of the second packet does match the generated n-tuple filter, apply a filter action based on the generated filter and the received second packet, wherein the filter action is selected from: discarding the second packet; recording a byte count and a packet count for the second packet; and forwarding the second packet until a specified byte count is reached.

13. The network device of claim 12 wherein the network application comprises one of File Transfer Protocol (FTP), Network File System (NFS), Common Internet File System (CIFS), Secure Shell (SSH), Secure Sockets Layer (SSL), Hypertext Transfer Protocol (HTTP), Microsoft SQL (MSSQL), SharePoint, and Outlook Web Access.

14. The network device of claim 12 wherein identification of an application is based on an inspection of the payload portion of the packet regardless of a port.

15. The network device of claim 12 wherein the network device comprises a switch.

16. The network device of claim 12 wherein the filter policy comprises:
    an application ID identifying a network application;
    an action indicating an action to be performed on a packet; and
    a byte count limit.

17. The network device of claim 12, wherein the 3-tuple filter comprises three of the following:
    a protocol field;
    an address field;
    a port field;
    an action field; and
    a byte count limit field.

18. The network device of claim 12, wherein the 5-tuple filter comprises five of the following:
    a protocol field;
    a source address field;
    a source port field;

a destination address field;
a destination port field;
an action field; and
a byte count limit field.

19. The network device of claim 17 wherein
the address field is copied from a destination address field of an IP header of the packet; and
the port field is copied from a destination port field of a TCP header of the packet.

20. The network device of claim 18 wherein
the source address field is copied from a source address field of a TCP header of the packet;
the source port field is copied from a source port field of the TCP header;
the destination address field is copied from a destination address field of the TCP header; and
the destination port field is copied from a destination port field of the TCP header.

21. A program storage device readable by a machine, embodying a program of instructions executable by the machine to perform a method, the method comprising:
    determining that an n-tuple of a packet does not match an n-tuple filter, wherein "n" is 3 or 5; and
    at a network device, upon determining that the n-tuple of the packet does not match the n-tuple filter:
        determining an identification of an application from a payload portion of the packet, the application identification ("ID") identifying a network application of the packet;
        upon determining the application ID is associated with a filter policy, generating an n-tuple filter based on the packet;
        storing the generated n-tuple filter;
        receiving a second packet; and
        upon determining that an n-tuple of the second packet does match the generated n-tuple filter, applying a filter action based on the generated filter and the received second packet, wherein the filter action is selected from: discarding the second packet; recording a byte count and a packet count for the second packet; and forwarding the second packet until a specified byte count is reached.

22. A network device comprising:
a memory and a computer program code configured with a processor to use the device to determine that an n-tuple of a packet does not match an n-tuple filter, wherein "n" is 3 or 5; and
upon determining that the n-tuple of the packet does not match the n-tuple filter:
    determining an identification of an application from a payload portion of the packet, the application identification ("ID") identifying a network application of the packet;
    upon determining the application ID is associated with a filter policy, generating an n-tuple filter based on the packet;
    storing the generated n-tuple filter;
    receiving a second packet; and
    upon determining that an n-tuple of the second packet does match the generated n-tuple filter, a means for applying a filter action based on the generated filter and the received second packet, wherein the filter action is selected from: discarding the second packet; recording a byte count and a packet count for the second packet; and forwarding the second packet until a specified byte count is reached.

* * * * *